(12) United States Patent
Kim et al.

(10) Patent No.: US 12,306,420 B2
(45) Date of Patent: May 20, 2025

(54) LIQUID LENS, CAMERA MODULE AND OPTICAL DEVICE INCLUDING THE SAME

(71) Applicant: LG INNOTEK CO., LTD., Seoul (KR)

(72) Inventors: Won Jin Kim, Seoul (KR); Jung Eun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 908 days.

(21) Appl. No.: 17/057,573

(22) PCT Filed: May 23, 2019

(86) PCT No.: PCT/KR2019/006167
§ 371 (c)(1),
(2) Date: Nov. 20, 2020

(87) PCT Pub. No.: WO2019/225975
PCT Pub. Date: Nov. 28, 2019

(65) Prior Publication Data
US 2021/0149088 A1    May 20, 2021

(30) Foreign Application Priority Data

May 23, 2018   (KR) .................. 10-2018-0058606

(51) Int. Cl.
*G02B 3/14*   (2006.01)
*G02B 7/02*   (2021.01)
(Continued)

(52) U.S. Cl.
CPC ............... *G02B 3/14* (2013.01); *G02B 7/021* (2013.01); *G03B 17/12* (2013.01); *H01B 1/12* (2013.01); *H04N 23/55* (2023.01)

(58) Field of Classification Search
CPC ...... G02B 3/14; G02B 27/646; G02B 26/005; G02B 3/12; G02B 7/021; G02B 7/08; (Continued)

(56) References Cited

U.S. PATENT DOCUMENTS 5,961,736 A * 10/1999 Borah ................. C11D 3/0042
134/28
2003/0049163 A1   3/2003 Malchesky et al.
(Continued)

FOREIGN PATENT DOCUMENTS

CN           1529892   *  9/2004 ............. H01G 9/022
CN         1843672 A    10/2006
(Continued)

*Primary Examiner* — Brandi N Thomas
(74) *Attorney, Agent, or Firm* — Birch, Stewart, Kolasch & Birch, LLP

(57) ABSTRACT

A liquid lens includes a first plate in which a cavity accommodating a conductive liquid and a non-conductive liquid is formed; a first electrode disposed on the first plate; a second electrode disposed under the first plate; a second plate disposed on the first electrode; and a third plate disposed under the second electrode, wherein the conductive liquid includes a solvent comprising 20 to 60% by weight of water and 20 to 60% by weight of antifreeze; 10 to 20% by weight of a solute; and 0.4 to 2% by weight of a chelation agent or an ion inhibitor.

8 Claims, 9 Drawing Sheets

(51) Int. Cl.
*G03B 17/12* (2021.01)
*H01B 1/12* (2006.01)
*H04N 23/55* (2023.01)

(58) Field of Classification Search
CPC .... G02B 13/0075; G02B 7/09; G02B 26/004;
G02B 7/028; G02B 2207/115; G02B
27/64; G02B 7/02; G02B 7/04; G02B
3/00; G02B 13/0045; G02B 2207/121;
G02B 6/12; G02B 13/0015; G02B 7/28;
G02B 13/001; G02B 7/023; G02B 1/14;
G02B 13/14; G02B 26/08; G02B 30/27;
G02B 7/008; G02B 7/102; G02B 5/208;
G02B 9/62; G02B 7/022; G02B 13/009;
G02B 7/003; G02B 26/0875; G02B
30/28; G02B 27/00; G02B 7/026; G02B
7/282; G02B 2207/00; G02B 26/00;
G02B 27/0075; G02B 27/286; G02B
3/0012; G02B 3/08; G02B 30/00; G02B
7/36; G02B 1/08; G02B 19/0014; G02B
19/0047; G02B 2027/0132; G02B 26/085;
G02B 27/0093; G02B 27/0101; G02B
27/017; G02B 27/0189; G02B 30/25;
G02B 30/29; G02B 5/0215; G02B 7/00;
H04N 23/55; H04N 23/57; H04N 23/54;
H04N 23/687; H04N 23/00; H04N
23/6812; H04N 23/67; H04N 23/53;
H04N 23/60; H04N 23/685; H04N 23/65;
H04N 23/62; H04N 23/63; H04N 23/68;
H04N 23/51; H04N 23/681; H04N
23/951; H04N 25/00; H04N 13/305;
H04N 23/686; H04N 25/48; H04N 5/265;
H04N 23/683; H04N 23/682; H04N
25/74; H04N 13/359; H04N 23/52; H04N
25/745; H04N 13/229; H04N 13/30;
H04N 13/356; H04N 13/376; H04N
13/383; H04N 23/45; H04N 23/56; H04N
23/58; H04N 23/6815; H04N 23/69;
G03B 17/12; G03B 30/00; G03B 5/00;
G03B 3/10; G03B 13/36; G03B
2205/0084; G03B 2205/0007; G03B
2217/007; G03B 2205/0053; G03B 13/32;
G03B 17/55; G03B 29/00; G03B 3/00;
G03B 2205/0015; G03B 2217/002; G03B
5/02; G03B 5/04; G03B 13/18; G03B
2205/00; G03B 17/02; G03B 2217/005;
G03B 2205/0046; G03B 2205/0038;
G03B 13/20; G03B 17/26; G03B 17/566;
G03B 3/12; G03B 13/34; G03B 19/07;
G03B 3/04; G03B 2205/0069; G03B
15/03; G03B 15/0592; G03B 37/04;
G02F 1/29; G02F 1/294; G02F 1/03;
G02F 2201/121; G02F 1/0316; G02F
2201/12; G02F 1/134309; G02F 2202/16;
G02F 2201/08; G02F 1/147; G02F
1/133526; G02F 1/1333; G02F 1/1337;
G02F 1/13471; G02F 1/13439; G02F
2201/122; G02F 1/133; G02F 1/13306;
G02F 1/13338; G02F 1/1339; G02F
1/134336; G02F 1/1362; G02F 1/136286;
G02F 1/137; G02F 1/13793; G02F
1/1523; G02F 2201/44; G02F 1/13; G02F
1/133528; G02F 1/133536; G02F
1/133538; G02F 1/1343; G02F 1/134381;
G02F 1/1393; G02F 1/291; G02F
2203/62

See application file for complete search history.

(56) References Cited

U.S. PATENT DOCUMENTS

| | | | |
|---|---|---|---|
| 2006/0102872 | A1 | 5/2006 | Liu et al. |
| 2007/0040146 | A1* | 2/2007 | Bae .................. G02B 1/06 |
| | | | 252/62.2 |
| 2007/0121276 | A1 | 5/2007 | Uzawa et al. |
| 2007/0177276 | A1 | 8/2007 | Liogier D'ardhuy et al. |
| 2009/0002838 | A1 | 1/2009 | Yokoyama et al. |
| 2010/0027098 | A1 | 2/2010 | Piroux et al. |
| 2011/0294974 | A1 | 12/2011 | Ohta et al. |
| 2013/0133891 | A1 | 5/2013 | Liu et al. |
| 2017/0315274 | A1* | 11/2017 | Park .................. G02B 27/646 |

FOREIGN PATENT DOCUMENTS

| | | | | |
|---|---|---|---|---|
| CN | 1937995 | * | 3/2007 | ............ A61Q 5/10 |
| JP | H05333207 | * | 12/1993 | |
| JP | 2003-288588 | A | 10/2003 | |
| JP | 2006-520918 | A | 9/2006 | |
| JP | 2007-52438 | A | 3/2007 | |
| JP | 2010-517059 | A | 5/2010 | |
| KR | 20030034977 | * | 5/2003 | |
| KR | 10-2006-0082776 | A | 7/2006 | |
| KR | 10-2007-0005922 | A | 1/2007 | |
| KR | 10-2008-0091790 | A | 10/2008 | |
| KR | 10-1124656 | B1 | 3/2012 | |
| KR | 10-1805128 | B1 | 12/2017 | |
| WO | WO 2007/113637 | A1 | 10/2007 | |
| WO | WO 2007111465 | * | 10/2007 | ............ G02B 1/14 |

* cited by examiner

[FIG. 1]
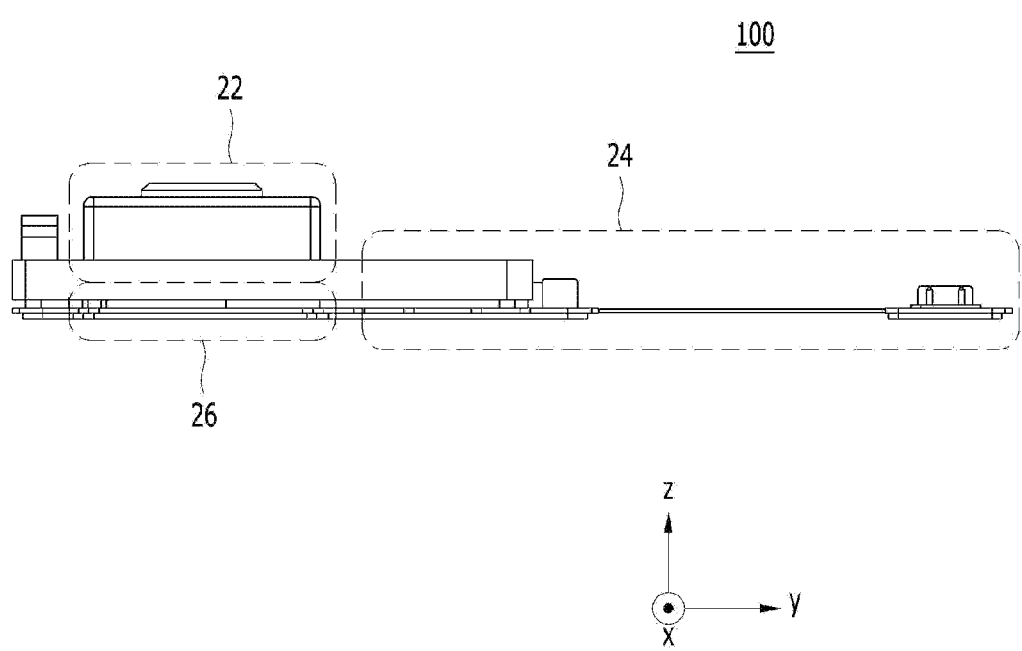

[FIG. 2]
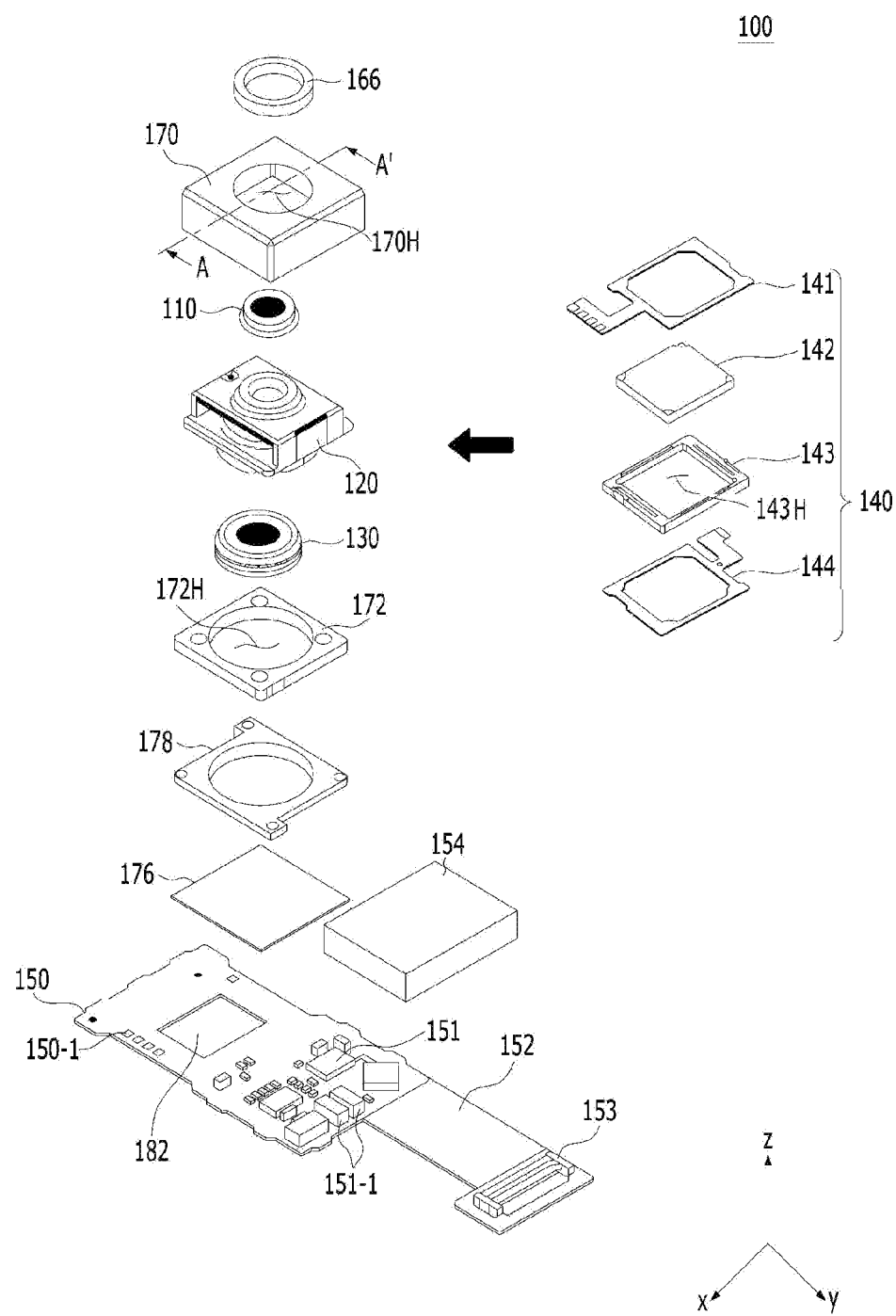

[FIG. 3]
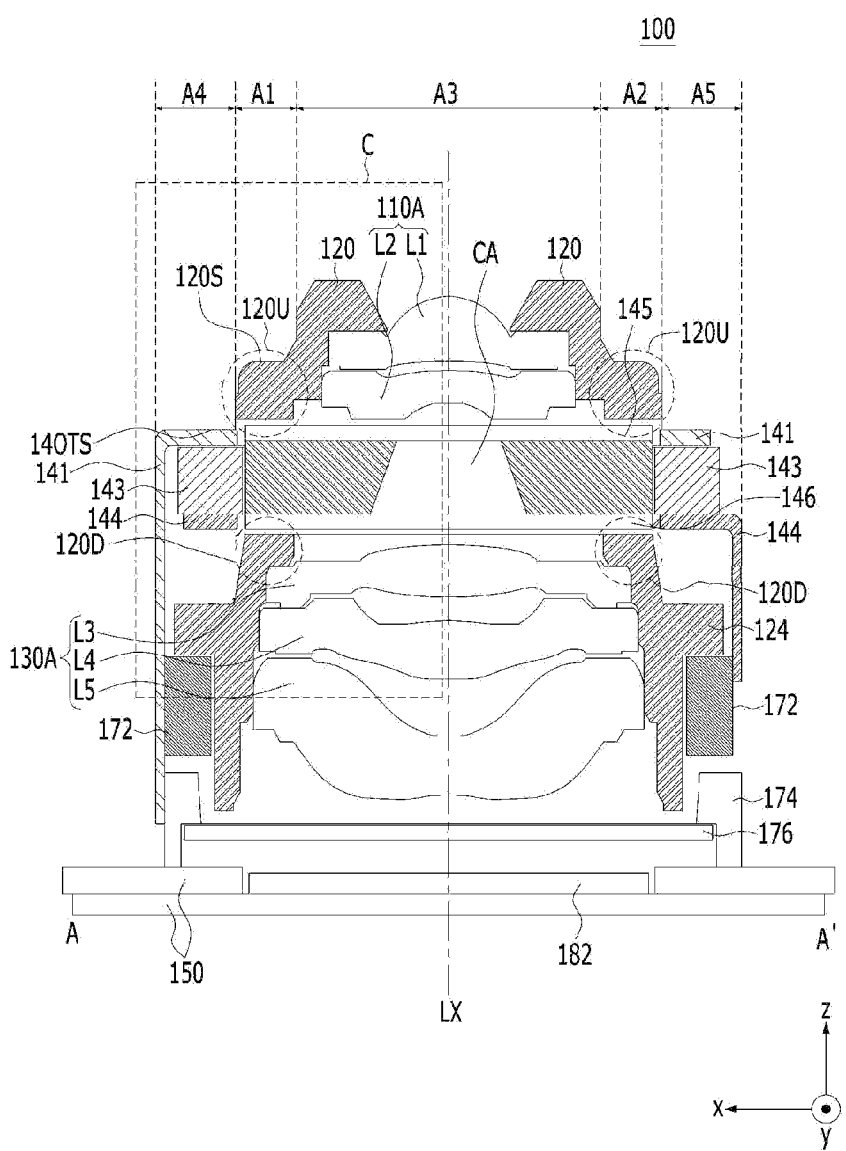

[FIG. 4]
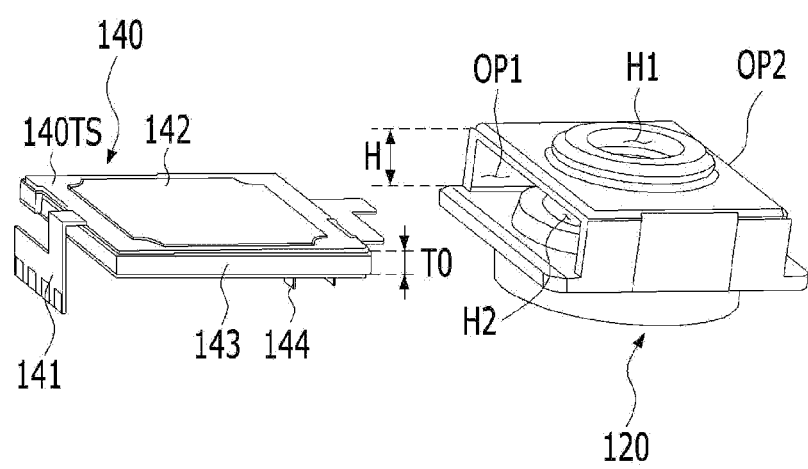

[FIG. 5]
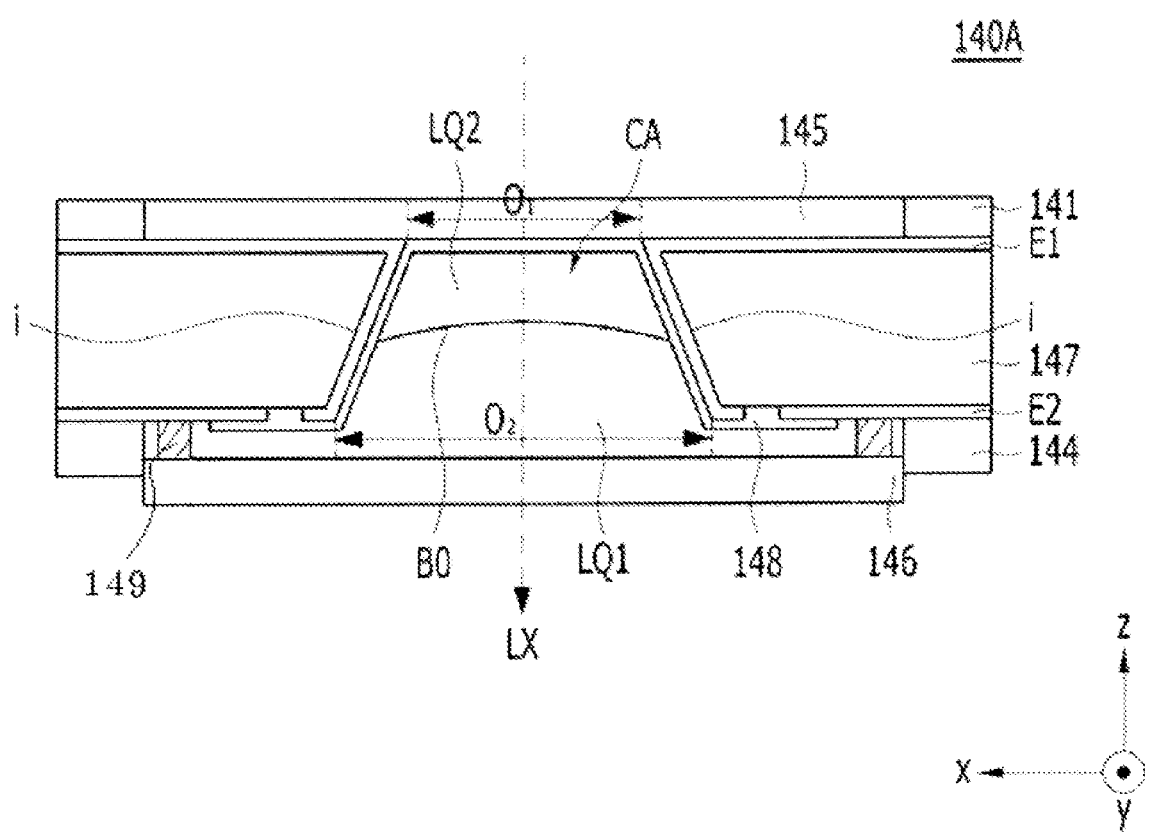

【FIG. 6】
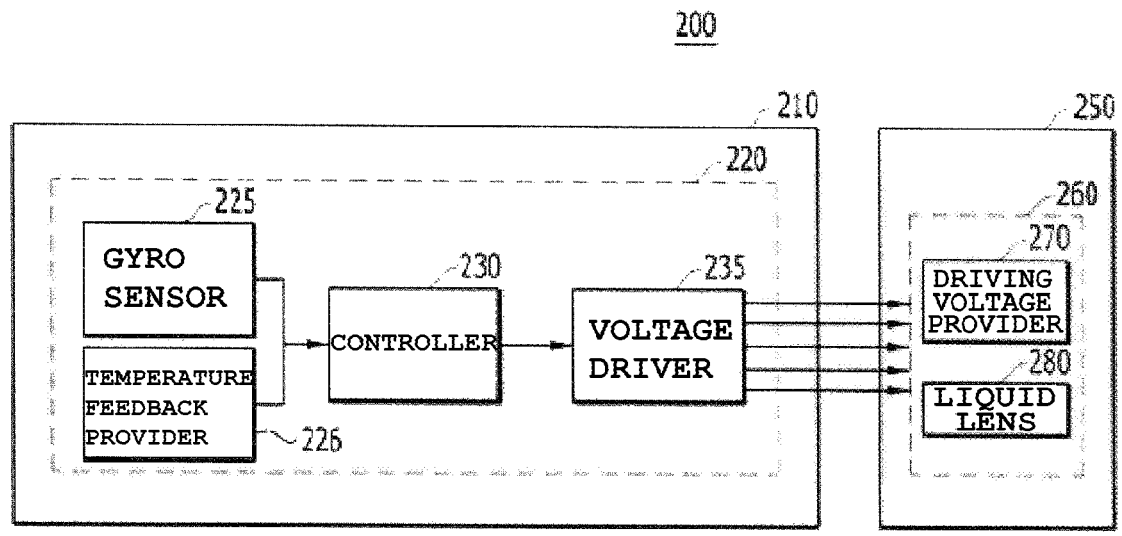
【FIG. 7】
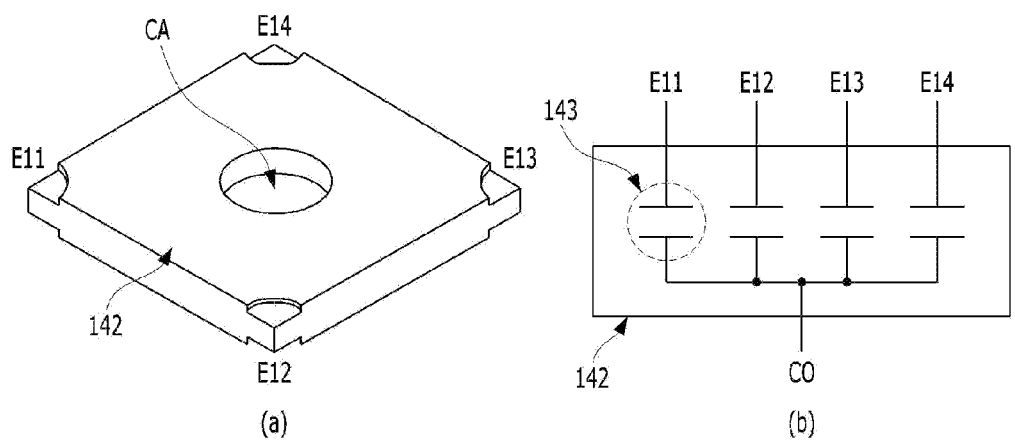

[FIG. 8]

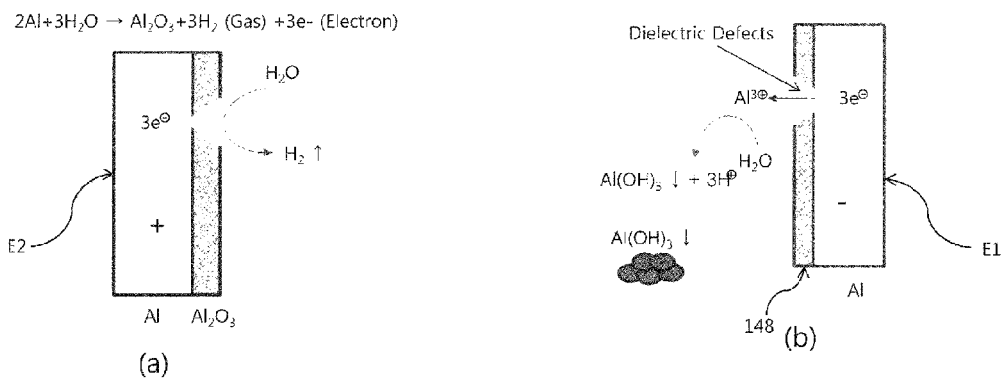

[FIG. 9]

| FUNCTION CLASSIFICATION | COMPOUND, ADDITIVE | wt.% |
|---|---|---|
| Solvents | Ethylene glycol | 20~60 |
| | Water | 20~60 |
| Solutes (IMPROVEMENT OF SPECIFIC RESISTANCE, WITHSTAND VOLTAGE CHARACTERISTICS, PHASE SEPARATION FROM OIL LAYER AT INTERFACE, AND TENSION OF INTERFACE) | Ammonium salt of a dibasic acid | 10~20 |
| Chelation agent, Inhibitor | Aminopolycarboxylic acid, Dibasic acid, or AROMATIC Alcohol | 0.4~2 |
| pH CONTROL, IMPROVEMENT IN RELIABILITY | Acid | 0.1~2 |

[FIG. 10]
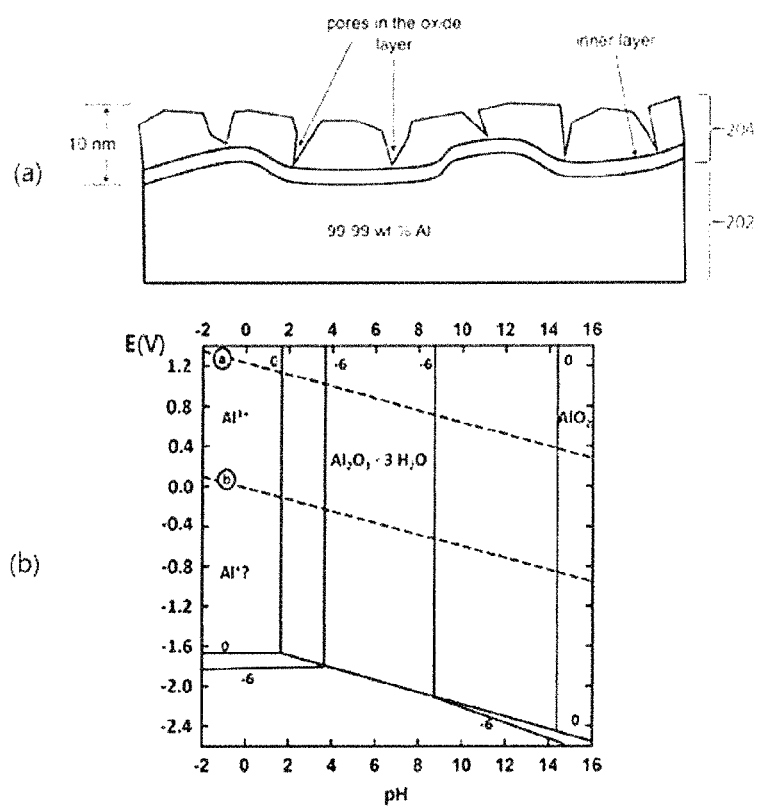
[FIG. 11]
| Inhibitor | Corrosion Rate (mpy) | Stabilization Energy (eV) |
|---|---|---|
| Phenol | 88.6 | 1.77 |
| o-Nitrophenol | 1.8 | 4.40 |
| m-Nitrophenol | 0.2 | 4.44 |
| p-Nitrophenol | 0.3 | 4.50 |
| Aniline | 86.8 | 1.11 |
| m-Nitroaniline | 0.4 | 4.53 |
| p-Nitroaniline | 0.5 | 4.57 |

[FIG. 12]

| CLASSIF-ICATION | COMPOUND | wt.% | 70°C/ HUMIDITY 90% | | |
|---|---|---|---|---|---|
| | | | BUBBLES | LONG-DISTANCE PERFORMANCE | SHORT-DISTANCE PERFORMANCE |
| 1$^{ST}$ ELEC-TROLYTE | Ethylene glycol | 20 | X | OK | OK |
| | Water | 60 | | | |
| | Ammonium adipate | 18 | | | |
| | Sulfamic acid | 1.6 | | | |
| | EDTA | 0.4 | | | |
| 2$^{ND}$ ELEC-TROLYTE | Ethylene glycol | 60 | X | OK | OK |
| | Water | 20 | | | |
| | Ammonium adipate | 19.2 | | | |
| | Boric acid | 0.4 | | | |
| | EDDA | 0.4 | | | |
| 3$^{RD}$ ELEC-TROLYTE | Ethylene glycol | 45 | X | OK | OK |
| | Water | 40 | | | |
| | Ammonium adipate | 14.4 | | | |
| | D-gluconic acid-delta-lactone | 0.1 | | | |
| | EDTA | 0.5 | | | |
| 4$^{TH}$ ELEC-TROLYTE | Ethylene glycol | 52 | X | OK | OK |
| | Water | 35 | | | |
| | Ammonium adipate | 12 | | | |
| | Meta nitrophenol | 1 | | | | ized
LIQUID LENS, CAMERA MODULE AND OPTICAL DEVICE INCLUDING THE SAME

CROSS REFERENCE TO RELATED APPLICATIONS

This application is the National Phase of PCT International Application No. PCT/KR2019/006167, filed on May 23, 2019, which claims priority under 35 U.S.C. 119 (a) to Patent Application No. 10-2018-0058606, filed in the Republic of Korea on May 23, 2018, all of which are hereby expressly incorporated by reference into the present application.

TECHNICAL FIELD

The present disclosure relates to a liquid lens, a camera module including the same, and an optical device. More particularly, the present disclosure relates to a camera module and an optical device, which include a lens enabling adjustment of a focal length using electrical energy.

BACKGROUND ART

People who use portable devices demand optical devices that have high resolution, are small, and have various photographing functions (e.g. an auto-focusing (AF) function, a hand-tremor compensation or optical image stabilizer (OIS) function, etc.). These photographing functions may be realized by directly moving a plurality of lenses that are combined. In the case in which the number of lenses is increased, however, the size of an optical device may be increased. The auto-focusing function and the hand-tremor compensation function are performed by moving or tilting several lens modules, which are fixed to a lens holder so as to be aligned with the optical axis, along the optical axis or in a direction perpendicular to the optical axis, and a separate lens-moving apparatus is used to move the lens modules. However, the lens-moving apparatus consumes a lot of power, and a cover glass needs to be provided separately from a camera module in order to protect the lens-moving apparatus, thus leading to an increase in the overall thickness. Therefore, research has been conducted on a liquid lens configured to electrically adjust the curvature of an interface between two types of liquids in order to perform the auto-focusing function and the hand-tremor compensation function.

DISCLOSURE

Technical Problem

According to the present disclosure, in a camera module that includes a lens enabling adjustment of the position of an interface formed between two liquids in response to electrical energy, the compositions or configurations of the two liquids included in the lens may be varied so that the stability, durability, and movement of the interface of the lens may be improved even when electrodes included in the lens are made from various kinds of metal.

In addition, according to the present disclosure, in a lens enabling adjustment of the position of an interface formed between two liquids in response to electrical energy, the constituent materials of an electrode that is in direct contact with an electrolyte, among the two liquids, may be varied in various manners due to the composition or configuration of the electrolyte, thereby more efficiently improving not only the stability of the lens but also the process of manufacturing the lens and increasing the yield and productivity of the lens.

In addition, according to the present disclosure, in a lens enabling adjustment of the position of an interface formed between two liquids in response to electrical energy, a first electrode, which is exposed to an electrolyte among the two liquids, and a second electrode, which is not exposed to the electrolyte, may be formed to have the same area as each other, thereby enabling more accurate control of movement of the interface depending on the voltage applied to the first electrode and the second electrode.

The objects to be accomplished by the disclosure are not limited to the above-mentioned objects, and other objects not mentioned herein will be clearly understood by those skilled in the art from the following description.

Technical Solution

A liquid lens according to an embodiment of the present disclosure may include a first plate in which a cavity accommodating a conductive liquid and a non-conductive liquid is formed, a first electrode disposed on the first plate, a second electrode disposed under the first plate, a second plate disposed on the first electrode, and a third plate disposed under the second electrode. The conductive liquid may include a solvent including 20 to 60% by weight of water and 20 to 60% by weight of antifreeze, 10 to 20% by weight of a solute, and 0.4 to 2.0% by weight of a chelation agent or an ion inhibitor.

In addition, the first electrode and the second electrode may include at least one of silver, copper, gold, aluminum, tungsten, zinc, chrome, or nickel.

In addition, the area of the first electrode and the area of the second electrode may be identical.

In addition, the solute may include 12 to 19.2% by weight of ammonium adipate $((NH_4)_2(C_4H_8(COO)_2)$.

In addition, the chelation agent or the ion inhibitor may include 1.6% by weight of sulfamic acid and 0.4% by weight of ethylene-diamine-tetraacetic acid (EDTA).

In addition, the chelation agent or the ion inhibitor may include 0.4% by weight of boric acid and 0.4% by weight of ethylenediamine-N,N'-diacetic acid (EDDA).

In addition, the chelation agent or the ion inhibitor may include 0.1% by weight of D-gluconic acid-delta-lactone and 0.5% by weight of ethylene-diamine-tetraacetic acid (EDTA).

In addition, the chelation agent or the ion inhibitor may include 1% by weight of meta-nitrophenol.

In addition, the non-conductive liquid may include an antioxidant.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to the present disclosure will be described below.

In relation to a camera module or an optical device, which includes a lens enabling adjustment of the position of an interface formed between two liquids in response to electrical energy, the present disclosure may improve the stability, durability, and movement of the interface of the lens.

In addition, the present disclosure may improve the productivity and yield of a lens enabling adjustment of the position of an interface formed between two liquids in response to electrical energy.

In addition, the present disclosure may stabilize the characteristics of a lens enabling adjustment of the position of an interface formed between two liquids in response to electrical energy, thereby enabling more precise and accurate control of the lens.

The effects achievable through the disclosure are not limited to the above-mentioned effects, and other effects not mentioned herein will be clearly understood by those skilled in the art from the following description.

DESCRIPTION OF DRAWINGS

The accompanying drawings are included to provide a further understanding of the disclosure, and illustrate embodiments of the disclosure together with the detailed description. However, the technical features of the disclosure are not limited to specific drawings, and the features shown in the drawings may be combined to construct a new embodiment.

FIG. 1 illustrates a schematic side view of a camera module according to an embodiment.

FIG. 2 illustrates an exploded perspective view of an embodiment of the camera module shown in FIG. 1.

FIG. 3 illustrates a cross-sectional view of the camera module shown in FIG. 2.

FIG. 4 is a view for explaining the holder and the liquid lens unit shown in FIGS. 1 and 3.

FIG. 5 illustrates a cross-sectional view of an embodiment of the liquid lens unit including the liquid lens according to the embodiment described above.

FIG. 6 is a schematic block diagram of the camera module.

FIGS. 7(a) and (b) are views for explaining a liquid lens, the interface of which is adjusted in response to a driving voltage.

FIG. 8 illustrates the limitation related to a conductive liquid in a liquid lens.

FIG. 9 illustrates a first example of the composition or configuration of a conductive liquid included in a liquid lens.

FIG. 10 illustrates the effect of formation of aluminum oxide ($Al_2O_3$) and acid-base balance (pH control) in a liquid lens including an aluminum electrode as an example of a metal having high electrical conductivity.

FIG. 11 illustrates an example of a chelation agent or an ion inhibitor in a liquid lens including an aluminum electrode as an example of an alkali metal.

FIG. 12 illustrates a second example of the composition or configuration of a conductive liquid included in a liquid lens.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a lens assembly and a camera module including the same according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 4.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a plurality of lens units and a holder in which the plurality of lens units is accommodated. As will be described below, the plurality of lens units may include a liquid lens, and may further include a first lens unit or a second lens unit. The plurality of lens units may include first and second lens units and a liquid lens unit.

The control circuit 24 serves to supply a driving voltage (or an operation voltage) to the liquid lens unit.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

FIG. 2 illustrates an exploded perspective view of an embodiment of the camera module 100 shown in FIG. 1.

Referring to FIG. 2, the camera module 100 may include a lens assembly, a main board 150, and an image sensor 182. In addition, the camera module 100 may further include a first cover 170 and a middle base 172. In addition, the camera module 100 may further include at least one adhesive member. The at least one adhesive member serves to couple or fix a liquid lens unit 140 to a holder 120. In addition, the camera module 100 may further include a sensor base 178 and a filter 176, as illustrated in FIG. 2, or may not include the sensor base 178 and the filter 176, unlike what is illustrated in FIG. 2. In addition, the camera module 100 may further include a circuit cover 154. The circuit cover 154 may have an electromagnetic shielding function.

Hereinafter, the camera module 100 shown in FIG. 2 will be described as further including the sensor base 178 and the filter 176. However, the following description may also apply to the case in which these components 176 and 178 are omitted.

According to the embodiment, at least one of the components 110 to 178 of the camera module 100 shown in FIG. may be omitted. Alternatively, at least one component different from the components 110 to 178 shown in FIG. 2 may be further included in the camera module 100.

FIG. 3 is a cross-sectional view of the camera module 100 shown in FIG. 2. That is, FIG. 3 is a cross-sectional view taken along line A-A' in the camera module 100 shown in FIG. 2. For convenience of description, the first cover 170, the circuit cover 154, and the connector 153 shown in FIG. 2 are not illustrated in FIG. 3, and may in practice be omitted from the camera module 100.

Referring to FIGS. 2 and 3, the lens assembly may include at least one of the liquid lens unit 140, the holder 120, a first lens unit 110 or 110A, or a second lens unit 130 or 130A, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens unit 140.

The first lens unit 110 may be disposed at the upper side of the lens assembly, and may be a region on which light is incident from outside the lens assembly. That is, the first lens unit 110 or 110A may be disposed above the liquid lens unit 140 within the holder 120. The first lens unit 110 or 110A may be implemented using a single lens, or may be implemented using two or more lenses that are aligned along a center axis to form an optical system.

Here, the center axis may be an optical axis LX of the optical system, which is formed by the first lens unit 110 or 110A, the liquid lens unit 140, and the second lens unit 130 or 130A included in the camera module 100, or may be an axis parallel to the optical axis LX. The optical axis LX may correspond to the optical axis of the image sensor 182. That is, the first lens unit 110 or 110A, the liquid lens unit 140, the second lens unit 130 or 130A, and the image sensor 182 may be aligned along the optical axis LX through active alignment (AA).

Here, active alignment may mean an operation of aligning the optical axes of the first lens unit 110 or 110A, the second lens unit 130 or 130A, and the liquid lens unit 140 with each other and adjusting an axial relationship or distance relationship between the image sensor 182 and the lens units 110 or 110A, 130 or 130A, and 140 in order to acquire an improved image.

In an embodiment, active alignment may be performed through an operation of analyzing image data generated by the image sensor 182, which receives light introduced from a specific object via at least one of the first lens unit 110 or 110A, the second lens unit 130 or 130A, or the liquid lens unit 140. For example, active alignment may be performed in the following sequence.

In one example, after active alignment (first alignment), which adjusts relative positions between the first lens unit 110 or 110A and the second lens unit 130 or 130A, which are fixedly mounted to the holder 120, and the image sensor 182, is completed, active alignment (second alignment), which adjusts relative positions between the liquid lens unit 140, which is inserted into the holder 120, and the image sensor 182, may be performed. The first alignment may be performed as a gripper grips the middle base 172 and displaces the middle base 172 to various positions, and the second alignment may be performed as the gripper grips a spacer 143 of the liquid lens unit 140 and displaces the spacer to various positions.

However, active alignment may be performed in any other sequence different from the above-described sequence.

Assuming the case in which the middle base 172 is omitted, active alignment may be performed in the state in which the gripper grips a protruding portion 124 of the holder 120. At this time, when the protruding portion 124 has a small thickness, active alignment may not be accurately performed. In order to prevent this, the camera module 100 may include the middle base 172, which is thicker than the protruding portion 124 of the holder 120. Management of the thickness of the holder 120 may be necessary in order to form the holder 120, which has a complicated shape compared to the shape of the middle base 172, using injection molding or the like. When the thickness of a portion of the holder 120 for active alignment is not sufficient for gripping, the middle base 172 may be added so that active alignment may be performed in the state in which the gripper grips a portion of the middle base 172. However, when the thickness of the protruding portion 124 is sufficiently large, the middle base 172 may be omitted. In addition, the protruding portion 124 and the middle base 172 may be coupled to each other using an adhesive member, for example, epoxy.

In another example, after active alignment (third alignment), which adjusts relative positions between the first lens unit 110 or 110A, the second lens unit 130 or 130A, and the liquid lens unit 140, which are fixedly mounted to the holder 120, is completed, active alignment (fourth alignment), which adjusts relative positions between the lenses of the lens assembly, which have completely undergone the third alignment, and the image sensor 182 may be performed. The third alignment may be performed as a gripper grips the spacer 143 of the liquid lens unit 140 and displaces the spacer to various positions, and the fourth alignment may be performed as the gripper grips the middle base 172 and displaces the middle base to various positions.

In addition, as illustrated in FIG. 3, the first lens unit 110A may include, for example, two lenses L1 and L2, but this is merely given by way of example, and the first lens unit 110A may include one lens, or three or more lenses.

In addition, an exposure lens may be disposed at the upper side of the first lens unit 110 or 110A. Here, the exposure lens may be the outermost lens among the lenses included in the first lens unit 110 or 110A. That is, the lens L1 located at the uppermost side of the first lens unit 110A may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

In addition, the outer diameter of each of the lenses L1 and L2 included in the first lens unit 110A may gradually increase in a direction approaching the bottom (e.g. in the −z-axis direction), but the embodiment is not limited thereto.

FIG. 4 is a view for explaining the holder 120 and the liquid lens unit 140 shown in FIGS. 2 and 3. That is, FIG. 4 illustrates an exploded perspective view of the holder 120 and the liquid lens unit 140. The holder 120 shown in FIG. 4 may include first and second holes H1 and H2 and first to fourth sidewalls.

FIG. 2 illustrates a plan view of the state before a first connection substrate 141 and a second connection substrate 144 are bent in the −z-axis direction, and FIG. 4 illustrates the state after the first connection substrate 141 is bent in the −z-axis direction. Further, as shown in FIG. 3, the spacer 143 may be disposed between the first connection substrate 141 and the second connection substrate 144, and may be disposed so as to protrude from at least one of a first or second opening OP1 or OP2 in the holder 120.

In addition, the spacer 143 may be disposed so as to surround the side surface of the liquid lens 142 in a ring shape. The spacer 143 may include, at the upper portion and the lower portion thereof, uneven portions in order to increase coupling force with the connection substrates 141 and 144 using an adhesive material. The connection substrates 141 and 144 may have a shape corresponding to the shape of the spacer 143, and may include a ring shape.

The first and second holes H1 and H2 may be formed respectively in the upper portion and the lower portion of the holder 120 to open the upper portion and the lower portion of the holder 120, respectively. Here, the first hole H1 and the second hole H2 may be through-holes. The first lens unit 110 or 110A may be accommodated in, mounted in, seated in, in contact with, fixed to, provisionally fixed to, supported by, coupled to, or disposed in the first hole H1, which is formed in the holder 120, and the second lens unit 130 or 130A may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, as illustrated in FIG. 4, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens unit 140 is disposed, may be open due to the first and second openings OP1 and OP2. In this case, the liquid lens unit 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens unit 140 may be inserted into the inner space in the holder 120 through the first opening OP1.

As such, in order to allow the liquid lens unit 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens unit 140 in the y-axis direction and the z-axis direction. For example, the height H corresponding to the size of each of the first and second openings OP1 and OP2 in the direction of the optical axis LX may be greater than the thickness TO of the liquid lens unit 140.

The second lens unit 130 or 130A may be disposed below the liquid lens unit 140 within the holder 120. The second lens unit 130 or 130A may be spaced apart from the first lens unit 110 or 110A in the optical-axis direction (e.g. in the z-axis direction).

The light introduced into the first lens unit 110 or 110A from outside the camera module 100 may pass through the liquid lens unit 140 and may be introduced into the second lens unit 130 or 130A. The second lens unit 130 or 130A may be implemented using a single lens, or may be implemented using two or more lenses, which are aligned along the center axis to form an optical system. For example, as illustrated in FIG. 3, the second lens unit 130A may include three lenses L3, L4 and L5, but this is merely given by way of example, and two or less lenses or four or more lenses may be included in the second lens unit 130 or 130A.

In addition, the outer diameter of each of the lenses L3, L4 and L5 included in the second lens unit 130A may gradually increase in a direction approaching the bottom (e.g. in the −z-axis direction), but the embodiment is not limited thereto.

Unlike the liquid lens unit 140, each of the first lens unit 110 or 110A and the second lens unit 130 or 130A may be a solid lens formed of glass or plastic, but the embodiment is not limited as to a specific material of each of the first lens unit 110 or 110A and the second lens unit 130 or 130A.

In addition, referring to FIG. 3, the liquid lens unit 140 may include first to fifth areas A1, A2, A3, A4 and A5.

The first area A1 is an area disposed inside the first opening OP1 in the holder 120, the second area A2 is an area disposed inside the second opening OP2 in the holder 120, and the third area A3 is an area between the first area A1 and the second area A2. The fourth area A4 is an area protruding from the first opening OP1 in the holder 120 and disposed outside the holder 120 at the side of the first opening OP1. The fifth area A5 is an area protruding from the second opening OP2 in the holder 120 and disposed outside the holder 120 at the side of the second opening OP2.

In addition, as shown in FIG. 2, the liquid lens unit 140 may include a first connection substrate (or an individual electrode connection substrate) 141, a liquid lens (or a liquid lens body) 142, the spacer 143, and a second connection substrate (or a common electrode connection substrate) 144.

The first connection substrate 141 may electrically connect a plurality of first electrodes (not shown) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of a plurality of first electrodes. To this end, after the liquid lens unit 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (not shown) included in the liquid lens 142 to the main board 150, and may be disposed below the liquid lens 142. The second connection substrate 144 may be implemented as an FPBC or a single metal substrate (a conductive metal plate). Here, the first and second electrodes will be described later in detail with reference to FIG. 5.

The second connection substrate 144 may be electrically connected to an electrode pad, which is formed on the main board 150, via a connection pad, which is electrically connected to the second electrode. To this end, after the liquid lens unit 140 is inserted into the inner space of the holder 120, the second connection substrate 144 may be subjected to bending in the -z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The liquid lens 142 may include a cavity CA. As shown in FIG. 3, the open area in the direction in which light is introduced into the cavity CA may be smaller than the open area in the opposite direction. Alternatively, the liquid lens 142 may be disposed such that the direction of inclination of the cavity CA is opposite what is illustrated. That is, unlike the illustration of FIG. 3, the open area in the direction in which light is introduced into the cavity CA may be greater than the open area in the opposite direction. In addition, when the liquid lens 142 is disposed such that the direction of inclination of the cavity CA is opposite what is illustrated, the arrangement of all or some of the components included in the liquid lens 142 may be changed, or only the direction of inclination of the cavity CA may be changed and the arrangement of the remaining components may not be changed, according to the direction of inclination of the liquid lens 142. The concrete configuration of the liquid lens 142 will be described later in detail with reference to FIG. 5.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

For example, the spacer 143 may include a hollow region 143H in which the liquid lens 142 is accommodated, and a frame configured to surround the hollow region 143H formed in the center thereof. As such, the spacer 143 may have a centrally-hollowed square planar shape (hereinafter referred to as a '☐'-shaped form), but the embodiment is not limited thereto.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction is greater than the length of the holder 120 in the x-axis direction. Thus, portions of the spacer 143, which protrude from the first and second sidewalls, may respectively correspond to the fourth area A4 and the fifth area A5 shown in FIG. 3.

In addition, the spacer 143 may be brought into contact with a gripper when the spacer 143 is inserted into the holder 120 and during active alignment.

In addition, at least a portion of the spacer 143 may be disposed in at least one of the first opening OP1 or the second opening OP2. In the case of FIG. 3, the spacer 143 is illustrated as not being disposed in the first opening OP1 and the second opening OP2. However, unlike the illustration, as illustrated in FIGS. 2 and 4, it can be appreciated that at least a portion of the spacer 143 is disposed in each of the first and second openings OP1 and OP2 since the spacer 143 has a '☐'-shaped form and surrounds the liquid lens 142.

In addition, at least a portion of the liquid lens 142 may be disposed in at least one of the first opening OP1 or the second opening OP2. Referring to FIG. 3, it can be appreciated that a first plate 147 of the liquid lens 142, which is a component of the liquid lens 142, is disposed in each of the first and second openings OP1 and OP2.

In addition, only at least a portion of the spacer 143 may be disposed in each of the first and second openings OP1 and OP2, and the liquid lens 142 may not be disposed therein.

In addition, referring to FIG. 3, the holder 120 may include a holder upper area 120U disposed above the liquid lens unit 140 and a holder lower area 120D disposed below the liquid lens unit 140. In this case, each of the first and second adhesive members may couple each of the holder upper area 120U and the holder lower area 120D to the liquid lens unit 140.

The first cover 170 may be disposed so as to surround the holder 120, the liquid lens unit 140, and the middle base 172, and may protect these components 120, 140 and 172 from external impacts. In particular, since the first cover 170 is disposed, a plurality of lenses, which forms an optical system, may be protected from external impacts.

In addition, in order to allow the first lens unit 110 or 110A disposed in the holder 120 to be exposed to external light, the first cover 170 may include an upper opening 170H formed in the upper surface of the first cover 170.

In addition, a window formed of a light-transmitting material may be disposed in the upper opening 170H, whereby it is possible to prevent foreign substances such as dust or moisture from entering the camera module 100.

In addition, the first cover 170 may be disposed so as to cover the upper surface and the first to fourth sidewalls of the holder 120.

Meanwhile, referring to FIGS. 2 and 3, the middle base 172 may be disposed so as to surround the second hole H2 in the holder 120. To this end, the middle base 172 may include an accommodating hole 172H for accommodating the second hole H2 therein. The inner diameter of the middle base 172 (i.e. the diameter of the accommodating hole 172H) may be equal to or greater than the outer diameter of the second hole H2.

Here, each of the accommodating hole 172H in the middle base 172 and the second hole H2 is illustrated as having a circular shape, but the embodiment is not limited thereto, and these holes may be changed to various other shapes.

In the same manner as the upper opening 170H in the first cover 170, the accommodating hole 172H may be formed near the center of the middle base 172 at a position corresponding to the position of the image sensor 182, which is disposed in the camera module 100.

The middle base 172 may be mounted on the main board 150 so as to be spaced apart from a circuit element 151 on the main board 150. That is, the holder 120 may be disposed on the main board 150 so as to be spaced apart from the circuit element 151.

The main board 150 may be disposed below the middle base 172, and may include a recess in which the image sensor 182 may be mounted, seated, tightly disposed, fixed, provisionally fixed, supported, coupled, or accommodated, the circuit element 151, a connection part (or an FPCB) 152, and a connector 153.

The circuit element 151 of the main board 150 may constitute a control module, which controls the liquid lens unit 140 and the image sensor 182. Here, the circuit element 151 may include at least one of a passive element or an active element, and may have any of various areas and heights. The circuit element 151 may be provided in a plural number, and may have a height greater than the height of the main board 150 so as to protrude outwards. The plurality of circuit elements 151 may be disposed so as not to overlap the holder 120 in the direction parallel to the optical axis LX. For example, the plurality of circuit elements 151 may include a power inductor, a gyro sensor, and the like, but the embodiment is not limited as to a specific type of the circuit elements 151.

The main board 150 may include a holder area in which the holder 120 is disposed and an element area in which the plurality of circuit elements 151 is disposed.

The main board 150 may be implemented as a rigid flexible printed circuit board (RFPCB) including the FPCB 152. The FPCB 152 may be subjected to bending depending on the requirement of the space in which the camera module 100 is mounted.

The image sensor 182 may perform a function of converting the light that has passed through the first lens unit 110, the liquid lens unit 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

Meanwhile, the connector 153 may electrically connect the main board 150 to a power supply or some other devices (e.g. an application processor) outside the camera module 100.

Hereinafter, an embodiment of a method of manufacturing the camera module 100 will be described with reference to the accompanying drawings.

First, the image sensor 182 may be mounted on the main board 150, and the holder 120, to which the middle base 172 is coupled, may be mounted on, seated on, in contact with, provisionally fixed to, supported by, coupled to, or disposed on the main board 150. Although not illustrated, a second cover may be coupled to or disposed on the holder 120 together with the middle base 172, and the holder 120 may be mounted on, seated on, in contact with, provisionally fixed to, supported by, coupled to, or disposed on the main board 150.

At this time, active alignment (first alignment) between the first lens unit 110 or 110A and the second lens unit 130 or 130A, which are mounted in the holder 120, and the image sensor 182 may be performed. The first alignment may be performed by adjusting the positions of the middle base 172 and the holder 120 while supporting opposite sides of the middle base 172. The first alignment may be performed while moving a jig, which presses and fixes opposite sides of the middle base 172. The middle base 172 may be fixed to the main board 150 in the completed state of the first alignment.

Subsequently, the liquid lens unit 140 may be inserted into the holder 120 through at least one of the first opening OP1 or the second opening OP2 in the holder 120, and active alignment between the liquid lens unit 140 and the image sensor 182 may be performed as second alignment. The second alignment may be performed by adjusting the position of the liquid lens unit 140 while supporting the liquid lens unit 140 in the x-axis direction. The second alignment may be performed while moving a jig, which presses and fixes the liquid lens unit 140 in the x-axis direction.

Subsequently, each of the first connection substrate 141 and the second connection substrate 144 may be subjected to bending so as to be electrically connected to the main board 150. After the bending process, a soldering process is performed to electrically connect each of the first connection substrate 141 and the second connection substrate 144 to the main board 150.

Subsequently, the first lens unit 110, the holder 120, the second lens unit 130, the liquid lens unit 140, and the middle base 172 are covered with the first cover 170 so as to complete the camera module 100.

Meanwhile, some of the plurality of circuit elements 151 shown in FIG. 2 may cause electromagnetic interference (EMI) or noise. In particular, among the plurality of circuit elements 151, a power inductor 151-1 may cause greater EMI than other elements. In order to block EMI or noise, the circuit cover 154 may be disposed so as to cover the circuit elements 151 disposed in the element area of the main board 150.

In addition, when the circuit cover 154 is disposed so as to cover the circuit elements 151, the circuit elements 151 disposed on the main board 150 may be protected from external impacts. To this end, the circuit cover 154 may include an accommodating space for accommodating therein and covering the circuit elements 151, in consideration of the shape and position of the circuit elements 151 disposed on the main board 150.

Meanwhile, the filter 176 may filter light within a specific wavelength range, among the light that has passed through the first lens unit 110 or 110A, the liquid lens unit 140, and the second lens unit 130 or 130A. The filter 176 may be an infrared (IR) light blocking filter or an ultraviolet (UV) light blocking filter, but the embodiment is not limited thereto. The filter 176 may be disposed above the image sensor 182. The filter 176 may be disposed inside the sensor base 178. For example, the filter 176 may be disposed or mounted in an inner recess in the sensor base 178 or on a stepped portion thereof.

The sensor base 178 may be disposed below the middle base 172, and may be attached to the main board 150. The sensor base 178 may surround the image sensor 182, and may protect the image sensor 182 from foreign substances or external impacts.

The main board 150 may be disposed below the sensor base 178, the sensor base 178 may be mounted on the main board 150 so as to be spaced apart from the circuit elements 151, and the holder 120 in which the middle base 172, the second lens unit 130 or 130A, the liquid lens unit 140, and the first lens unit 110 or 110A are disposed may be disposed above the sensor base 178.

In addition, the camera module 100 shown in FIG. 2 may not include the sensor base 178 and the filter 176.

Hereinafter, an embodiment 140A of the liquid lens unit 140 included in the camera module 100 according to the embodiment described above will be described with reference to FIG. 5. FIG. 5 illustrates a cross-sectional view of the embodiment 140A of the liquid lens unit 140 including the liquid lens according to the embodiment described above.

The liquid lens unit 140A shown in FIG. 5 may include a first connection substrate 141, a liquid lens 142, a spacer 143, and a second connection substrate 144. The spacer 143 has been described above, and thus a duplicate description thereof will be omitted. For convenience of description, illustration of the spacer 143 is omitted from FIG. 5.

The liquid lens 142 may include a plurality of different types of liquids LQ1 and LQ2, first to third plates 147, 145 and 146, first and second electrodes E1 and E2, and an insulation layer 148. The liquid lens 142 may further include an optical layer (not shown).

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed on a contact portion between the first and second liquids LQ1 and LQ2. For example, the second liquid LQ2 may be disposed on the first liquid LQ1, but the embodiment is not limited thereto.

In addition, in the cross-sectional shape of the liquid lens 142, the edges of the first and second liquids LQ2 and LQ1 may be thinner than the center portions thereof.

The first liquid LQ1 may be oil, and for example, may be phenyl-based silicon oil. The second liquid LQ2 may be formed of, for example, a mixture of ethylene glycol and sodium bromide (NaBr).

Each of the first liquid LQ1 and the second liquid LQ2 may include at least one of a sterilizer or an antioxidant. The sterilizer may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to prevent a change in the physical properties of the first and second liquids LQ1 and LQ2 attributable to oxidation of the first and second liquids LQ1 and LQ2 or propagation of microorganisms.

The inner side surface of the first plate 147 may form a sidewall i of the cavity CA. The first plate 147 may include upper and lower openings having a predetermined inclined surface. That is, the cavity CA may be defined as an area that is surrounded by the inclined surface of the first plate 147, a third opening that is in contact with the second plate 145, and a fourth opening that is in contact with the third plate 146.

The diameter of a wider opening among the third and fourth openings may be changed depending on the field of view (FOV) required for the liquid lens 142 or the role of the liquid lens 142 in the camera module 100. According to the embodiment, the size (the area or the width) of the fourth opening $O_2$ may be greater than the size (the area or the width) of the third opening $O_1$. Here, the size of each of the third and fourth openings may be the cross-sectional area in the horizontal direction (e.g. the x-axis direction and the y-axis direction). For example, the size of each of the third and fourth openings may mean the radius when the opening has a circular cross-section, and may mean the diagonal length when the opening has a square cross-section.

Each of the third and fourth openings may take the form of a hole having a circular cross-section. The interface BO formed by the two liquids may be moved along the inclined surface of the cavity CA by a driving voltage.

The first liquid LQ1 and the second liquid LQ2 are charged, accommodated, or disposed in the cavity CA in the first plate 147. In addition, the cavity CA is the area through which the light that has passed through the first lens unit 110 or 110A passes. Thus, the first plate 147 may be formed of a transparent material, or may include impurities so that light does not easily pass therethrough.

The electrodes may be disposed respectively on one surface and the other surface of the first plate 147. A plurality of first electrodes E1 may be disposed on one surface (e.g. the upper surface, the side surface, and the lower surface) of the first plate 147 so as to be spaced apart from the second electrode E2. The second electrode E2 may be disposed on at least a portion of the other surface (e.g. the lower surface) of the first plate 147 and may be in direct contact with the first liquid LQ1.

In addition, the first electrodes E1 may be "n" electrodes (hereinafter, referred to as 'individual electrodes'), and the second electrode E2 may be a single electrode (hereinafter, referred to as a 'common electrode'). Here, "n" may be an integer of 2 or greater.

Each of the first and second electrodes E1 and E2 may include at least one electrode sector. For example, the first electrode E1 may include two or more electrode sectors, and the second electrode E2 may include at least one electrode sector. For example, the plurality of first electrodes E1 may include a plurality of electrode sectors sequentially disposed in the clockwise direction (or in the counterclockwise direction) about the optical axis. Here, the electrode sector means a portion of the electrode.

A portion of the second electrode E2 (i.e. an electrode sector of the second electrode E2) disposed on the other surface of the first plate 147 may be exposed to the first liquid LQ1, which is conductive.

Each of the first and second electrodes E1 and E2 may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity CA.

In addition, the second plate 145 may be disposed on one surface of the first electrodes E1. That is, the second plate 145 may be disposed above the first plate 147. Specifically, the second plate 145 may be disposed on the upper surface of the first electrodes E1 and the cavity CA.

In addition, the liquid lens unit 140A shown in FIG. 5 may further include a bonding member 149. The bonding member (or adhesive) 149 may be disposed between the first plate 147 and the third plate 146, and may serve to engage the first plate 147 and the third plate 146 with each other.

Alternatively, the liquid lens unit 140A shown in FIG. may further include a plate leg 149, rather than the bonding member 149. The plate leg 149 is disposed between the first plate 147 and the third plate 146, and serves to support the third plate 146. Here, the plate leg 149 may be made of the same material as the third plate 146, and may be integrally formed therewith.

Hereinafter, the case in which the plate leg 149 is integrally formed with the third plate 146 will be described. However, the following description may also apply to the case in which the plate leg 149 is provided separately from the third plate 146.

The third plate 146 may be disposed on one surface of the second electrode E2. That is, the third plate 146 may be disposed below the first plate 147. Specifically, the third plate 146 may be disposed under the lower surface of the second electrode E2 and the cavity CA.

The second plate 145 and the third plate 146 may be disposed so as to face each other, with the first plate 147 interposed therebetween. In addition, at least one of the second plate 145 or the third plate 146 may be omitted.

At least one of the second or third plate 145 or 146 may have a rectangular planar shape. The third plate 146 may be brought into contact with and bonded to the first plate 147 on a bonding area thereof around the edge.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 or 110A to travel into the cavity CA in the first plate 145.

The third plate 146 may be configured to allow the light that has passed through the cavity CA in the first plate 145 to travel to the second lens unit 130 or 130A. The third plate 146 may be in direct contact with the first liquid LQ1.

According to the embodiment, the third plate 146 may have a diameter greater than the diameter of a wider opening among the third and fourth openings in the first plate 147. In addition, the third plate 146 may include a peripheral area spaced apart from the first plate 147.

In addition, the actual effective lens area of the liquid lens 142 may be narrower than the diameter (e.g. $O_2$) of a wider opening among the third and fourth openings in the first plate 147.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover a portion of the first electrode E1, which forms the sidewall of the cavity CA. In addition, the insulation layer 148 may be disposed on the lower surface of the first plate 147 so as to cover the first electrode E1, the first plate 147, and a portion of the second electrode E2. Thus, contact between the first electrode E1 and the first liquid LQ1 and contact between the first electrode E1 and the second liquid LQ2 may be prevented by the insulation layer 148.

The insulation layer 148 may cover one electrode among the first and second electrodes E1 and E2 (e.g. the first electrode E1), and may expose a portion of the other electrode (e.g. the second electrode E2) so that electrical energy is applied to the first liquid LQ1, which is conductive.

In the case of the camera module 100 according to the embodiment, the filter 176 for the blocking of ultraviolet light or infrared light is disposed between the middle base 172 and the image sensor 182, and filters light within a specific wavelength range, among the light that has passed through the first lens unit 110, the liquid lens 142, and the second lens unit 130. In addition, such an infrared light blocking filter or an ultraviolet light blocking filter is mounted in an inner recess in the sensor base 178.

At least one substrate, for example, the first connection substrate 141 and the second connection substrate 144, serves to supply a voltage to the liquid lens 142. To this end, the plurality of first electrodes E1 may be electrically connected to the first connection substrate 141, and the second electrode E2 may be electrically connected to the second connection substrate 144.

When a driving voltage is applied to the first and second electrodes E1 and E2 through the first connection substrate 141 and the second connection substrate 144, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100, and the optical device may perform an auto-focusing (AF) function and a hand-tremor compensation or optical image stabilizer (OIS) function.

The first connection substrate 141 may transmit four different driving voltages (hereinafter, referred to as 'individual voltages') to the liquid lens 142, and the second connection substrate 144 may transmit one driving voltage (hereinafter, referred to as a 'common voltage') to the liquid lens 142. The common voltage may include a DC voltage or an AC voltage. When the common voltage is applied in a pulse form, the pulse width or the duty cycle may be constant. The individual voltages supplied via the first connection substrate 141 may be applied to the plurality of first electrodes E1 (or the plurality of electrode sectors) exposed at the respective corners of the liquid lens 142.

Although not illustrated, when conductive epoxy is disposed between the first connection substrate 141 and the plurality of first electrodes E1, the first connection substrate 141 and the plurality of first electrodes E1 may be in contact with each other, may be coupled to each other, and may be in electrical conduction with each other. In addition, when conductive epoxy is disposed between the second connection substrate 144 and the second electrode E2, the second connection substrate 144 and the second electrode E2 may be in contact with each other, may be coupled to each other, and may be in electrical conduction with each other.

In addition, the first connection substrate 141 and the plurality of first electrodes E1 may be implemented as separate elements, or may be integrally formed. In addition, the second connection substrate 144 and the second electrode E2 may be implemented as separate elements, or may be integrally formed.

FIG. 6 is a schematic block diagram of the camera module 200.

Referring to FIG. 6, the camera module 200 may include a control circuit 210 and a lens assembly 250. The control circuit 210 may correspond to the control circuit 24 shown in FIG. 1, and the lens assembly 250 may correspond to the lens assembly 22 shown in FIG. 1 or the lens assembly 110, 120, 130 and 140 shown in FIG. 2.

The control circuit 210 may include a control unit 220, and may control the operation of the liquid lens unit 140 including a liquid lens 280.

The control unit 220 may have a configuration for performing an AF function and an OIS function, and may control the liquid lens 280 included in the lens assembly 250 using a user request or the result of detection (e.g. a motion signal of a gyro sensor 225). Here, the liquid lens 280 may correspond to the above-described liquid lens 142.

The control unit 220 may include a gyro sensor 225, a controller 230, and a voltage driver 235. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate a driving voltage corresponding to the desired shape of the liquid lens 280 based on a focal length, which is required to focus on the object, using the distance information.

The controller 230 may store a driving voltage table in which a driving voltage and a driving voltage code for making the voltage driver 235 generate the driving voltage are mapped, may acquire a driving voltage code corresponding to the calculated driving voltage by referring to the driving voltage table, and may output the acquired driving voltage code to the voltage driver 235.

The voltage driver 235 may generate a driving voltage in an analog form, which corresponds to the driving voltage code, based on a driving voltage code in a digital form provided from the controller 230, and may provide the driving voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, as described above, the liquid lens 280 may include the four first electrodes E1 including four electrode sectors, the first connection substrate 141, the second electrode E2, and the second connection substrate 144 for driving. Opposite ends of the liquid lens 280 may mean any one of the plurality of first electrodes E1 and the second electrode E2. In addition, opposite ends of the liquid lens 280 may mean any one of the four electrode sectors of the four first electrodes E1 and one electrode sector of the second electrode E2.

A pulse-type voltage having a predetermined width may be applied to each electrode sector of the liquid lens 280, and the driving voltage applied to the liquid lens 280 is the difference between the voltages applied to each of the first electrodes E1 and the second electrode E2.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the first electrodes E1 and the second electrode E2.

The control circuit 210 may further include a connector (not shown), which performs a communication or interface function of the control circuit 210. For example, the connector may perform communication protocol conversion for communication between the control circuit 210, which uses an inter-integrated circuit (I2C) communication method, and the lens assembly 250, which uses a mobile industry processor interface (MIPI) communication method. In addition, the connector may receive power from an external source (e.g. a battery), and may supply power required for the operation of the control unit 220 and the lens assembly 250. In this case, the connector may correspond to the connector 153 shown in FIG. 2.

The lens assembly 250 may include the liquid lens module 260, and the liquid lens module 260 may include a driving voltage provider 270 and the liquid lens 280.

The driving voltage provider 270 may receive a driving voltage from the voltage driver 235, and may provide the driving voltage to the liquid lens 280. Here, the driving voltage may be an analog voltage applied between any one of the "n" individual electrodes and one common electrode.

The driving voltage provider 270 may include a voltage adjustment circuit (not shown) or a noise removal circuit (not shown) for compensating for loss due to terminal connection between the control circuit 210 and the lens assembly 250, or may divert the voltage provided from the voltage driver 235 to the liquid lens 280.

The driving voltage provider 270 may be disposed on an FPCB (or a substrate), which constitutes at least a portion of the connection part 152, but the embodiment is not limited thereto. The connection part 152 may include the driving voltage provider 270.

The liquid lens 280 may be deformed at the interface BO thereof between the first liquid LQ1 and the second liquid LQ2 by a driving voltage, thereby performing at least one of an AF function or an OIS function.

In addition, variation in the characteristics of the liquid lens 280 depending on temperature may be fed back to a temperature feedback provider 226, the temperature feedback provider 226 may output the feedback result to the controller 230, and the controller 230 may compensate for variation in the characteristics of the liquid lens 280 depending on temperature using the same. Here, the temperature feedback provider 226 may be omitted.

FIGS. 7(a) and (b) are views for explaining the liquid lens 142, the interface of which is adjusted in response to a driving voltage. Specifically, FIG. 7(a) illustrates a perspective view of the liquid lens 142 according to the embodiment, and FIG. 7(b) illustrates an equivalent circuit of the liquid lens 142. Here, the liquid lens 142 is the same as the liquid lens 142 of FIG. 2, and thus is designated by the same reference numeral.

First, referring to FIG. 7(a), the liquid lens 142, the interface BO of which is adjusted in shape to correspond to a driving voltage, may receive the driving voltage via a plurality of electrode sectors E11, E12, E13 and E14 of the plurality of first electrodes E1, which are disposed in four different directions to have the same angular distance therebetween, and an electrode sector C0 of the second electrode E2. When the driving voltage is applied via any one of the plurality of electrode sectors E11, E12, E13 and E14 of the plurality of first electrodes E1 and the electrode sector C0 of the second electrode E2, the shape of the interface BO between the first liquid LQ1 and the second liquid LQ2, which are disposed in the cavity CA, may be deformed. The degree of deformation and the shape of the interface BO between the first liquid LQ1 and the second liquid LQ2 may be controlled by the controller 230 in order to implement at least one of an AF function or an OIS function.

In addition, referring to FIG. 7(b), the liquid lens 142 may be explained as a plurality of capacitors 143, in which one side of the liquid lens 142 receives a voltage from the different electrode sectors E11, E12, E13 and E14 of the first electrodes E1, and the other side of the liquid lens 142 is connected to the electrode sector C0 of the second electrode E2 so as to receive a voltage therefrom.

In FIG. 7(a), the number of different electrode sectors E11, E12, E13 and E14 included in the plurality of first electrodes E1 is illustrated as being four, but the embodiment is not limited thereto.

Here, the two electrodes E1 and E2 are divided into a second electrode E2, which is exposed to the conductive liquid LQ1, and a first electrode E1, which is not exposed to the conductive liquid LQ1. Referring to FIGS. 7(a) and 5, the second electrode E2, which is exposed to the conductive liquid LQ1, may be connected to the common terminal C0, and the first electrode E1, which is not exposed to the conductive liquid LQ1, may be connected to different individual terminals. The first electrode E1, which is connected to the different individual terminals, may be divided into multiple segments, which are electrically and physically separated from each other.

Meanwhile, in some embodiments, the area of the second electrode E2 and the area of the first electrode E1 may be substantially the same. Here, the area of the first electrode E1 may be equal to the sum of the areas of the multiple segments. Further, all of the multiple segments included in the first electrode E1 may have substantially the same area as each other.

The electrical characteristics of the liquid lens 140A described with reference to FIGS. 7(a) and 5 may be explained as those of multiple unit capacitors, which are divided and connected in parallel on the basis of multiple segments included in the first electrode E1, as described with reference to FIG. 7(b). Further, the electrical characteristics of the liquid lens 140A may be explained as those of a single capacitor on the basis of the second electrode E2 and the first electrode E1 thereof. In the case in which the area of the second electrode E2 and the area of the first electrode E1 are substantially the same, when the liquid lens 140A is regarded as one capacitor, this may mean that the areas of the two electrodes of the capacitor are substantially the same. Further, when all of the multiple segments included in the first electrode E1 have substantially the same area, this may mean that the capacitances of the unit capacitors, which are connected in parallel, are substantially the same in the same environment or conditions. In this case, the electrical characteristics of the liquid lens 140A, which may be described as those of a capacitor, may be more clearly specified, thereby enabling more precise and accurate control of the liquid lens 140A and reduced control error. This results in improved operational safety and performance of the liquid lens 140A.

The two liquids LQ1 and LQ2 included in the liquid lens 140A may be different types of fluids having the same density. For example, the conductive liquid LQ1 may be a water ($H_2O$)-based fluid, and the non-conductive liquid LQ2 may be an oil-based fluid. Here, the conductive liquid LQ1 and the non-conductive liquid LQ2 are colorless and transparent fluids.

When a voltage is applied to the second electrode E2 and the first electrode E1, the interface BO in the liquid lens 140A moves. For example, in the state in which the conductive liquid LQ1 and the non-conductive liquid LQ2 are in contact with each other and form the interface BO therebetween on the first electrode E1 coated with the insulation layer 148, when a voltage is applied to the first electrode E1 and the conductive liquid LQ1, the surface tension of the conductive liquid LQ1 may change, and accordingly, the shape of the interface BO between the conductive liquid LQ1 and the non-conductive liquid LQ2 may change.

Meanwhile, when a voltage is applied to the second electrode E2 and the first electrode E1, ions contained in the conductive liquid LQ1 may move in a manner of being adsorbed to the second electrode E2 or the insulation layer 148. In this case, the properties of the surface of the second electrode E2 or the insulation layer 148 may change (e.g. from hydrophobicity to hydrophilicity or vice versa), which may cause electrowetting. Specifically, the water-based conductive liquid LQ1 moves along the surface of the second electrode E2 or the insulation layer 148, and the oil-based non-conductive liquid LQ2 is pushed away from the surface. Through this phenomenon, the interface BO between the conductive liquid LQ1 and the non-conductive liquid LQ2 is varied (specifically, is varied in curvature).

In order to increase the reactivity of the conductive liquid LQ1 to the voltage applied to the second electrode E2 and the first electrode E1, halogen elements may be included in the conductive liquid LQ1. Here, the halogen elements include F, Cl, Br, I, At, and Ts, which are elements of Group 17 of the periodic table of the elements. Halogen elements are non-metallic elements, and have very high reactivity, among all elements. The smaller the period (the closer to fluorine (F)), the higher the reactivity.

The second electrode E2 and the first electrode E1 are made of metals having high electrical conductivity (e.g. silver, copper, gold, aluminum, tungsten, zinc, chrome, nickel, etc.). However, most metals having high electrical conductivity are unstable materials that are refined by applying a large amount of energy to natural ores, and thus have a tendency to return to the stable natural state (i.e. tendency to ionize) due to corrosion of metals. This tendency is called a tendency to react.

When the conductive liquid LQ1 contains halogen elements in order to increase the reactivity thereof and the second electrode E2 exposed to the conductive liquid LQ1 contains a metal having high electrical conductivity, the second electrode E2 and the conductive liquid LQ1 may undergo a chemical reaction or an electrochemical reaction.

For example, it may be assumed that the second electrode E2 or the first electrode E1 contains aluminum (Al), which has high electrical conductivity. When the second electrode E2 or the first electrode E1 comes into contact with the conductive liquid LQ1 containing halogen elements (e.g. Cl), a chemical reaction may occur, as shown in Formula 1 below.

$$Al + 3Cl^- \rightarrow AlCl_3 + 3e-$$

$$AlCl_3 + 3H_2O \rightarrow Al(OH)_3 + 3HCl \quad \text{[Formula 1]}$$

Aluminum chloride ($AlCl_3$) produced by the above reaction may be hydrolyzed, with the result that a white smoke may be emitted, and a crystal such as aluminum hydroxide ($Al(OH)_3$) may be generated. Emission of a gas or generation of a crystal changes the optical refractive index, leading to loss of the function of the liquid lens 140A.

In order to provide a variety of configurations of the second electrode E2 and the first electrode E1 included in the liquid lens 140A, it is necessary to change the composition or configuration of the conductive liquid LQ1. Specifically, the conductive liquid LQ1 may be composed of a halogen-free electrolyte. Here, "halogen-free" means that halogen elements are not contained in the conductive liquid LQ1. When a halogen element is vaporized, it may destroy the atmospheric ozone layer, and when burned, it may be converted into a harmful substance. Thus, halogen elements, such as fluorine (F), bromine (Br), chlorine (Cl), iodine (I), and astatine (At), are classified as hazardous substances, so there are industrial restrictions thereon (e.g. Montreal Protocol, IEC/IEC 61249-2-21, JPCA/JPCA-ES-01-2003, etc.). For example, in IEC and JPCA, chlorine (Cl) and bromine (Br) are limited to a maximum amount of 900 mg/kg, and the total amount of halogen elements is limited to a maximum of 1,500 mg/kg. In an embodiment of the present disclosure, the content of halogen elements in the conductive liquid LQ1 is maintained at 50 ppm or less, so the liquid lens 140A contains a substantially halogen-free electrolyte.

FIG. 8 illustrates the limitation related to the conductive liquid in the liquid lens. For example, FIG. 8(*a*) illustrates a chemical reaction in the case in which the second electrode E2 is in direct contact with the conductive liquid LQ1, and FIG. 8(*b*) illustrates an electrochemical reaction in the case in which the first electrode E1 is physically separated from the conductive liquid LQ1 by the insulation layer 148. Here, in FIGS. 8(*a*) and (*b*), it is assumed that the second electrode E2 and the first electrode E1 contain aluminum (Al) and that the conductive liquid LQ1 is a halogen-free electrolyte.

First, referring to FIG. 8(*a*), in the case in which the second electrode E2 contains aluminum (Al) and the conductive liquid LQ1 is made of a water ($H_2O$)-based material, aluminum (Al) and water ($H_2O$) undergo the chemical reaction shown in Formula 2 below, with the result that gas ($H_2$) may be generated.

$$2Al + 3H_2O \rightarrow Al_2O_3 + 3H_2(Gas) + 3e-(Electron) \quad \text{[Formula 2]}$$

That is, when aluminum (Al) in the second electrode E2 meets water ($H_2O$) in the conductive liquid LQ1, aluminum oxide ($Al_2O_3$) is generated on the surface of aluminum (Al), and gas (hydrogen, $H_2$) is generated. When the gas ($H_2$) is generated, bubbles may be generated in the liquid lens 140A, and the optical refractive index may be changed due to the bubbles, leading to loss of function as a lens. In addition, when the gas ($H_2$) is generated, the internal pressure in the cavity CA may increase, leading to damage to the liquid lens 140A.

Further, FIG. 8(*b*) illustrates the case in which the insulation layer 148, which prevents direct contact between the conductive liquid LQ1 containing halogen elements and a portion of the first electrode E1 (or second electrode E2), does not work properly, so a portion of the first electrode E1 (or second electrode E2) is exposed. In this case, aluminum (Al) in the exposed first electrode E1 (or second electrode E2) and water in the conductive liquid LQ1 may undergo an electrochemical reaction, as shown in Formula 3 below.

$$Al \rightarrow Al^{3+} + 3e-$$

$$Al^{3+} + 3H_2O \rightarrow Al(OH)_3 + 3H+ \quad \text{[Formula 3]}$$

A crystal such as aluminum hydroxide ($Al(OH)_3$) generated in this case may cause loss of the function of the liquid lens 140A.

As described above, although the conductive liquid LQ1 is composed of a halogen-free electrolyte, it is difficult to use a metal, such as aluminum (Al), which reacts with water ($H_2O$) and corrodes, for the electrode of the liquid lens 140A.

FIG. 9 illustrates a first example of the composition or configuration of a conductive liquid included in a liquid lens.

As illustrated, the conductive liquid may include compounds and additives to broadly perform four functions. First, water ($H_2O$) and antifreeze (ethylene glycol) may be included as solvents of the conductive liquid. The weight ratio of each of the water and the antifreeze used as solvents may range from 20 to 60 wt %. When the weight ratio of the antifreeze is less than 20 wt %, temperature reliability may be deteriorated (the antifreeze may not work properly and may freeze), and when the weight ratio of the antifreeze exceeds 60 wt %, the specific resistance may increase (the reactivity of the conductive liquid may decrease). Further, when the weight ratio of the water is less than 20 wt %, the specific resistance may increase, and when the weight ratio of the water exceeds 60 wt %, temperature reliability may be deteriorated, and the water may freeze.

Further, as solutes of the conductive liquid, the weight ratio of ammonium adipate $((NH_4)_2(C_4H_8(COO)_2)$ or ammonium salt of a dibasic acid may be 10 to 20 wt %. Here, when the weight ratio of the ammonium salt of a dibasic acid is less than 10 wt %, the specific resistance may increase, and an interface may not be formed properly due to separation of the conductive liquid and the non-conductive liquid. Further, when the weight ratio of the ammonium salt of a dibasic acid exceeds 20 wt %, withstand voltage characteristics may be deteriorated, and the conductive liquid may surround the non-conductive liquid, resulting in generation of micelles due to cohesion of molecules, thus leading to loss of the function of the liquid lens 140A.

In addition, the conductive liquid may include 0.4 to 2% by weight of a chelation agent and/or an ion inhibitor. Here, aminopolycarboxylic acid, dibasic acid, or aromatic alcohols may be used as the chelation agent or the ion inhibitor. When the weight ratio of the chelation agent or the ion inhibitor is less than 0.4 wt %, the chelation agent or the ion inhibitor may not sufficiently exhibit the effects thereof. On the other hand, when the weight ratio of the chelation agent or the ion inhibitor exceeds 2 wt %, withstand voltage characteristics may be deteriorated.

In addition, the conductive liquid may include 0.1 to 2 wt % of acid in order to maintain an acid-base balance (pH control) and to improve the reliability of the device.

As described above, when the conductive liquid is a halogen-free electrolyte (having a content of halogen elements of 50 ppm or less) containing a chelation agent or an ion inhibitor, corrosion resistance may be improved, thereby preventing corrosion of the electrode and enabling use of various types of metal materials for the electrode.

In particular, when an insulation film, which is formed in a metal oxide form on the metal surface of an electrode of a lens, cracks and the metal is exposed, a conductive liquid containing a chelation agent or an ion inhibitor prevents the metal from ionizing, thereby suppressing an electrochemical reaction or a chemical reaction. Therefore, when a metallic electrode is exposed through holes or gaps generated in the process of forming or assembling various structures in a lens, it is possible to secure the durability and safety of the lens, thereby improving yield and productivity. Further, it is possible to suppress a reaction of the metal constituting the electrode with water in a conductive liquid and to collect ionized metal (e.g. Al3+), thereby suppressing the generation of gas or deposits.

Meanwhile, acid-base balance (pH control) of a conductive liquid in a lens is highly related to the safety and performance of the lens. As the content of water ($H_2O$) in the conductive liquid increases, the equivalent series resistance (ESR) of the conductive liquid decreases, the electrical conductivity thereof increases, and the moving speed of ions increases. The operation speed of the lens (the reaction speed of the lens during AF or OIS operation) may be improved by adjusting the amount of water ($H_2O$) contained in the conductive liquid. However, it is necessary to limit the amount of water to 20 to 60 wt % or 20 to 50 wt % in consideration of safety.

In addition, the mixing ratio of antifreeze (ethylene glycol) and water ($H_2O$) may be adjusted in order to secure temperature safety considering the environment in which the camera module or optical device including the lens is used.

FIG. 10 illustrates the effect of formation of aluminum oxide ($Al_2O_3$) and acid-base balance (pH control) in a liquid lens including an aluminum electrode as an example of a metal having high electrical conductivity. Specifically, FIG. 10(a) illustrates aluminum oxide generated in pure aluminum in a natural state, and FIG. 10(b) illustrates a Pourbaix diagram showing the reactivity between aluminum oxide and water.

First, referring to FIG. 10(a), pure aluminum 202 (99.99 wt %) reacts with oxygen in a natural state to form a thin oxide film 204 on the surface thereof. At this time, the oxide film 204 is aluminum oxide ($Al_2O_3$), and may be formed to a thickness of about 10 nm. The oxide film 204 may be divided into an inner layer, which is formed evenly on the surface of the aluminum 202, and an outer layer, which is formed in a pore shape.

Referring to the Pourbaix diagram of FIG. 10(b), it can be seen that aluminum oxide ($Al_2O_3$) and water ($H_2O$) are in a very stable state at a pH of 5 to 8. Here, the Pourbaix diagram is a corrosion pattern diagram indicating the thermodynamic stability of a metal in an aqueous solution as a function of a potential and solution pH. Referring to the Pourbaix diagram of aluminum, in the case in which the second electrode E2 or the first electrode E1 shown in FIG. 5 is composed of aluminum (Al), when aluminum oxide ($Al_2O_3$) is formed on the surface of aluminum (Al) of the second electrode E2 or the first electrode E1, reaction with water ($H_2O$) contained in the conductive liquid LQ1 may not occur under the condition of a pH of 5 to 8.

FIG. 11 illustrates an example of a chelation agent or an ion inhibitor in a liquid lens including an aluminum electrode as an example of an alkali metal. Specifically, FIG. 11 illustrates the differences in the corrosion rate and stabilization energy depending on the type of ion inhibitor together with a metal.

As shown, the ion inhibitor is more suitable for use in a lens as the corrosion rate is lower and the stabilization energy is higher. As an ion inhibitor, nitrophenol ($C_6H_5NO_3$) may be more effective than other substances. Nitrophenol is a compound obtained by substituting hydrogen of phenol with a nitro group, and there are three isomers: ortho (o-), meta (m-), and para (p-). Among them, meta-nitrophenol and para-nitrophenol exhibit excellent corrosion rate and stabilization energy characteristics compared to ortho-nitrophenol.

However, although not shown, in the case of para-nitrophenol, which is excellent in terms of corrosion rate and stabilization energy, it is difficult to apply the same to a lens due to the physical property thereof by which it changes from colorless to yellowish in a pH range of 5.6 to 7.5. Therefore, in one embodiment of the present disclosure, meta-nitrophenol, which is excellent in terms of corrosion rate and stabilization energy and is colorless at a pH of 5 to 8, may be used as an ion inhibitor.

FIG. 12 illustrates a second example of the composition or configuration of a conductive liquid included in a liquid lens. Specifically, FIG. 12 illustrates the difference in the composition or configuration between conductive liquids according to four embodiments and variation in the diopter of the respective embodiments in a high-temperature (70° C.) and high-humidity (90%) environment.

In the case of first to fourth electrolytes of conductive liquids containing a chelation agent or an ion inhibitor, reference performance is satisfied, and no bubbles are generated.

As a chelation agent or an ion inhibitor, the first to fourth electrolytes include ammonium adipate $((NH_4)_2(C_4H_8(COO)_2)$ in solvents containing water ($H_2O$) and antifreeze (ethylene glycol) in order to lower specific resistance, to improve withstand voltage characteristics, and to improve the tension of an interface, thereby improving phase separation. Here, in the first to fourth electrolytes, ammonium adipate may have a weight ratio of 12 wt % to 19.2 wt %.

In some embodiments, the first electrolyte includes 1.6% by weight of sulfamic acid and 0.4% by weight of ethylenediamine-tetraacetic acid (EDTA).

In some embodiments, the second electrolyte includes, as a chelation agent or an ion inhibitor, 0.4% by weight of boric acid and 0.4% by weight of ethylenediamine-N,N'-diacetic acid (EDDA).

In some embodiments, the third electrolyte includes, as a chelation agent or an ion inhibitor, 0.1% by weight of D-gluconic acid-delta-lactone and 0.5% by weight of ethylene-diamine-tetraacetic acid (EDTA).

In some embodiments, the fourth electrolyte includes, as a chelation agent or an ion inhibitor, 1% by weight of meta-nitrophenol.

The above-described liquid lens may be included in the camera module. The camera module may include a lens assembly, which includes a liquid lens mounted in a housing and at least one solid lens that may be disposed on the front surface or the rear surface of the liquid lens, an image sensor for converting an optical signal transmitted through the lens assembly into an electrical signal, and a control circuit for supplying a driving voltage to the liquid lens.

Meanwhile, the operation and the operational method of the control circuit having the structure of the above-described embodiment may be programmed to be executed in a computer and may be stored on a computer-readable recording medium, and examples of the computer-readable recording medium may include ROM, RAM, a CD-ROM, a magnetic tape, a floppy disk, and an optical data storage device.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

Although only a limited number of embodiments have been described above, various other embodiments are possible. The technical contents of the above-described embodiments may be combined into various forms as long as they are not incompatible with one another, and thus may be implemented in new embodiments.

An optical device (or an optical instrument) including the above-described camera module may be implemented. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a liquid lens. In addition, the optical device may be implemented in a portable device such as, for example, a smartphone, a laptop computer, or a tablet computer. Such an optical device may include a camera module, a display unit configured to output an image, and a body housing in which the camera module and the display unit are mounted. A communication module capable of communicating with other devices may be mounted in the body housing of the optical device, and the optical device may further include a memory unit capable of storing data.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens according to embodiments may be used in camera/video devices, telescopic devices, microscopic devices, an interferometer, a photometer, a polarimeter, a spectrometer, a reflectometer, an auto-collimator, a lensmeter, a smartphone, a laptop computer, a tablet computer, etc.

The invention claimed is:

1. A liquid lens, comprising:
a first plate in which a cavity accommodating a conductive liquid and a non-conductive liquid is formed;
a first electrode disposed on the first plate;
a second electrode disposed under the first plate;
a second plate disposed on the first electrode; and
a third plate disposed under the second electrode,
wherein the conductive liquid comprises:
a solvent comprising 20 to 60% by weight of water and 20 to 60% by weight of antifreeze;
10 to 20% by weight of a solute; and
0.4 to 2% by weight of a chelation agent or an ion inhibitor,
wherein a content of halogen elements in the conductive liquid is maintained at 50 ppm or less so the liquid lens contains a substantially halogen-free electrolyte, and
wherein the chelation agent or the ion inhibitor comprises 1% by weight of meta-nitrophenol.

2. The liquid lens according to claim 1, wherein the first electrode and the second electrode comprise at least one of silver, copper, gold, aluminum, tungsten, zinc, chrome, or nickel.

3. The liquid lens according to claim 1, wherein an area of the first electrode and an area of the second electrode are identical.

4. The liquid lens according to claim 1, wherein the solute comprises 12 to 19.2% by weight of ammonium adipate $((NH_4)_2(C_4H_8(COO)_2)$.

5. The liquid lens according to claim 4, wherein the chelation agent or the ion inhibitor comprises 1.6% by weight of sulfamic acid and 0.4% by weight of ethylene-diamine-tetraacetic acid (EDTA).

6. The liquid lens according to claim 4, wherein the chelation agent or the ion inhibitor comprises 0.4% by weight of boric acid and 0.4% by weight of ethylenediamine-N,N'-diacetic acid (EDDA).

7. The liquid lens according to claim 4, wherein the chelation agent or the ion inhibitor comprises 0.1% by weight of D-gluconic acid-delta-lactone and 0.5% by weight of ethylene-diamine-tetraacetic acid (EDTA).

8. The liquid lens according to claim 1, wherein the conductive liquid has a pH of 5 to 8.

* * * * *